United States Patent
Kwak et al.

(10) Patent No.: US 9,576,741 B2
(45) Date of Patent: Feb. 21, 2017

(54) SOLID ELECTROLYTIC CAPACITOR AND PRODUCTION METHOD THEREOF

(71) Applicant: SAMSUNG ELECTRO-MECHANICS CO., LTD., Suwon-si, Gyeonggi-do (KR)

(72) Inventors: Sung Ho Kwak, Suwon-si (KR); Hee Sung Choi, Suwon-si (KR); Hun Chol Jung, Suwon-si (KR); Yeong Su Cho, Suwon-si (KR); Sung Soo Cha, Suwon-si (KR); Hee Dong Myung, Suwon-si (KR); Jeong Oh Hong, Suwon-si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 172 days.

(21) Appl. No.: 14/486,499

(22) Filed: Sep. 15, 2014

(65) Prior Publication Data

US 2015/0077904 A1    Mar. 19, 2015

(30) Foreign Application Priority Data

Sep. 16, 2013  (KR) .................. 10-2013-0111164

(51) Int. Cl.
*H01G 9/012*  (2006.01)
*H01G 9/15*   (2006.01)
(Continued)

(52) U.S. Cl.
CPC .......... *H01G 9/012* (2013.01); *H01G 9/0029* (2013.01); *H01G 9/08* (2013.01); *H01G 9/15* (2013.01); *Y10T 29/417* (2015.01)

(58) Field of Classification Search
CPC .......... H01G 9/008; H01G 9/012; H01G 9/08; H01G 9/15; H01G 2009/0014
See application file for complete search history.

(56) References Cited

U.S. PATENT DOCUMENTS 6,236,561 B1 * 5/2001 Ogino .................. H01G 9/012
                                                361/301.3
9,053,854 B2 * 6/2015 Petrzilek ............. H01G 9/0032
(Continued)

FOREIGN PATENT DOCUMENTS

JP    2005-019923 A     1/2005
JP    2006-332403 A    12/2006
(Continued)

*Primary Examiner* — Dion R Ferguson
(74) *Attorney, Agent, or Firm* — McDermott Will & Emery LLP

(57) ABSTRACT

The present invention relates to a solid electrolytic capacitor and a production method thereof.
A solid electrolytic capacitor of the present invention includes: a capacitor element having an anode wire inserted in one side surface thereof; a cathode terminal disposed on one side under the capacitor element to be electrically connected to the capacitor element; an anode terminal disposed on the other side under the capacitor element and having a bending portion integrally formed to be inclined to the capacitor element for electrical connection with the anode wire; and a molding portion surrounding the outside of the capacitor element and formed to expose lower surfaces of the cathode terminal and the anode terminal.

10 Claims, 5 Drawing Sheets

(51) Int. Cl.
*H01G 9/00* (2006.01)
*H01G 9/08* (2006.01)

(56) References Cited

U.S. PATENT DOCUMENTS

| | | | | |
|---|---|---|---|---|
| 2002/0167786 | A1* | 11/2002 | Sano | H01G 9/012 361/509 |
| 2004/0160730 | A1* | 8/2004 | Tsutsui | H01G 2/065 361/528 |
| 2009/0244812 | A1* | 10/2009 | Rawal | H01G 2/06 361/525 |
| 2012/0075775 | A1* | 3/2012 | Vyroubal | H01G 9/012 361/529 |
| 2012/0229957 | A1* | 9/2012 | Vyroubal | H01G 9/012 361/540 |
| 2015/0055277 | A1* | 2/2015 | Djebara | H01G 9/012 361/528 |

FOREIGN PATENT DOCUMENTS

| | | | |
|---|---|---|---|
| JP | 2007-096021 A | 4/2007 | |
| JP | 2008-109007 A | 5/2008 | |

\* cited by examiner

SOLID ELECTROLYTIC CAPACITOR AND PRODUCTION METHOD THEREOF

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2013-0111164, entitled filed Sep. 16, 2013, which is hereby incorporated by reference in its entirety into this application.

BACKGROUND OF THE INVENTION

1. Field of the Invention

The present invention relates to a solid electrolytic capacitor and a production method thereof, and more particularly, to a solid electrolytic capacitor with improved capacitance and a production method thereof.

2. Description of the Related Art

In general, a solid electrolytic capacitor is one of electronic components used for the purpose of cutting off a DC current and passing an AC current in addition to accumulating electricity and a tantalum capacitor is representatively produced as the solid electrolytic capacitor.

The tantalum capacitor is used for general industrial equipment and application circuits having a low rated voltage range, and particularly, it is mainly used to reduce noise of circuits or portable communication devices having defective frequency characteristics.

Such capacitor is basically manufactured by inserting a lead wire in a center portion of a tantalum element or a portion except the center portion or bending the inserted lead wire outside the tantalum element. A method of leading an anode terminal by spot-welding an anode (+) lead wire and an anode (+) lead frame and leading an electrode terminal by forming anode and cathode leads after mold packaging is mainly used as a method of assembling the lead frame with the tantalum element.

Further, there may be structural constraints on the expansion of the volume of the tantalum element, which determines capacitance, due to the structure in which the anode terminal and the cathode terminal are exposed through both side surfaces of the capacitor and an impedance (ESR) value may increase due to the increase in the length of the lead frame connected to the anode terminal and the cathode terminal.

RELATED ART DOCUMENT

Patent Document

Patent Document 1: Japanese Patent Laid-Open Publication No. 2008-109007

SUMMARY OF THE INVENTION

The present invention has been invented in order to overcome the above-described problems and it is, therefore, an object of the present invention to provide a solid electrolytic capacitor that can reduce ESR by configuring an electrode, which constitutes a solid electrolytic capacitor, through a terminal of a lower surface and electrically connecting a bending portion of an anode terminal, which functions as an anode lead frame, to a capacitor element at an acute angle to reduce an electrical signal length, and a production method thereof.

In accordance with one aspect of the present invention to achieve the object, there is provided a solid electrolytic capacitor including: a capacitor element having an anode wire inserted in one side surface thereof; a cathode terminal disposed on one side under the capacitor element to be electrically connected to the capacitor element; an anode terminal disposed on the other side under the capacitor element and having a bending portion integrally formed to be inclined to the capacitor element for electrical connection with the anode wire; and a molding portion surrounding the outside of the capacitor element and formed to expose lower surfaces of the cathode terminal and the anode terminal.

The cathode terminal may be electrically connected to the capacitor element through a conductive paste, wherein the conductive paste may be one selected from Ag, Au, Pd, Ni, and Cu pastes having viscosity.

Further, the cathode terminal may have an extending portion to the inside of the capacitor element, wherein a portion of a lower surface of the extending portion may be a stepped portion.

The bending portion may be bent from one side of the anode terminal to have an acute bending angle with respect to an upper surface of the anode terminal, wherein the bending angle may be 70° to 89.5° based on the upper surface of the anode terminal.

The bending portion may function as an anode lead frame for electrically connecting the anode terminal and the anode wire.

In accordance with another aspect of the present invention to achieve the object, there is provided a production method of a solid electrolytic capacitor including: disposing a cathode terminal and an anode terminal on the same plane of a carrier at predetermined intervals; forming a bending portion by bending a portion of the outside of the anode terminal at a predetermined angle; applying a conductive paste on an upper surface of the cathode terminal; mounting a capacitor element having an anode wire inserted in one side surface thereof on the cathode terminal applied with the conductive paste; adjusting a bending angle to bond an upper end portion of the bending portion to the anode wire; fixing the anode wire and the upper end portion of the bending portion by electrical welding; and forming a molding portion to surround the entire outer peripheral surface of the capacitor element except lower surfaces of the anode terminal and the cathode terminal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 4 to 10 are production process diagrams of an embodiment of the solid electrolytic capacitor in accordance with the present invention, wherein FIG. 4 is a cross-sectional view of the step of preparing an anode terminal and a cathode terminal, FIGS. 5 and 6 are cross-sectional views of the step of forming a bending portion of the anode terminal, FIG. 7 is a cross-sectional view of the step of applying a conductive paste on the cathode terminal, FIGS. 8 and 9 are cross-sectional views of the step of mounting a capacitor element on the anode terminal and the cathode terminal, and FIG. 10 is a cross-sectional view of the step of forming a molding portion on the capacitor element.

DETAILED DESCRIPTION OF THE PREFERABLE EMBODIMENTS

A matter regarding to an operation effect including a technical configuration for an object of a solid electrolytic capacitor and a production method thereof in accordance with the present invention to achieve the object will be clearly appreciated through the following detailed description with reference to the accompanying drawings illustrating preferable embodiments of the present invention.

Figure 1:
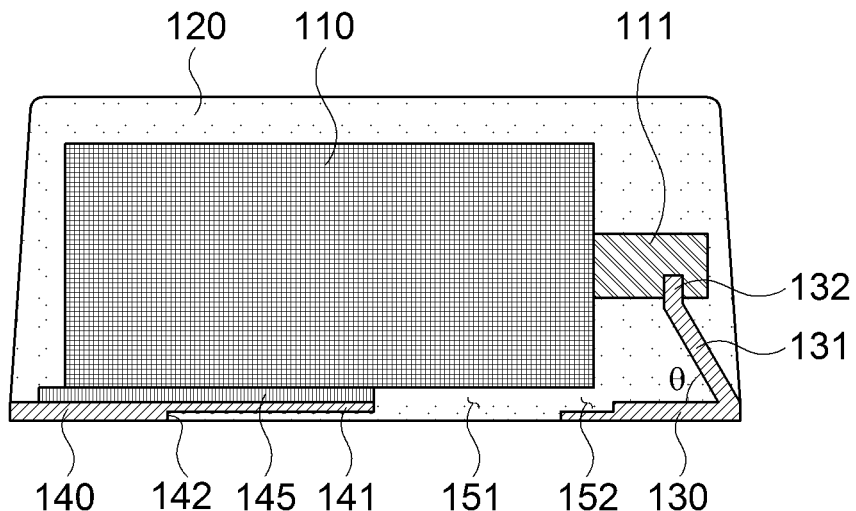
FIG. 1 is a perspective view of a solid electrolytic capacitor in accordance with an embodiment of the present invention.
Figure 2:
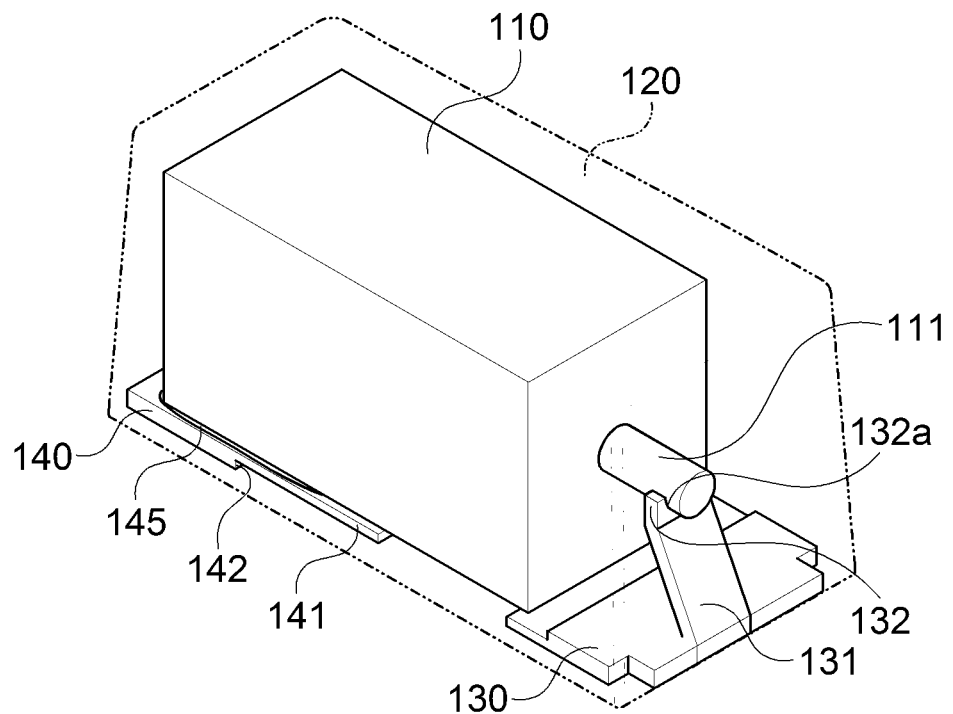
FIG. 2 is a side cross-sectional view of the solid electrolytic capacitor in accordance with an embodiment of the present invention.

First, FIG. 1 is a perspective view of a solid electrolytic capacitor in accordance with an embodiment of the present invention, and FIG. 2 is a side cross-sectional view of the solid electrolytic capacitor in accordance with an embodiment of the present invention.

As shown, a solid electrolytic capacitor 100 of the present embodiment may include a capacitor element 110, a molding portion 120 surrounding the capacitor element 110, and an anode terminal 130 and a cathode terminal 140 formed to be exposed to both sides of a lower surface of the molding portion 120.

At this time, the capacitor element 110 may have a rectangular parallelepiped shape, and one end portion of an anode wire 111 may be coupled to one side surface of the capacitor element 110 to be protruded to the outside. Further, the capacitor element 110 may have a cathode layer on an outer peripheral surface of a tantalum pellet having a positive polarity. Therefore, the wire having the other end portion inserted in the tantalum pellet constituting the capacitor element 110 may have a positive polarity according to the polarity of the tantalum pellet, and the terminal bonded to an outer peripheral surface of the capacitor element 110 may have a negative polarity. This will be described below in more detail.

The capacitor element 110 may be manufactured by a sintering process using a material such as niobium (Nb) oxide in addition to tantalum (Ta) as the material constituting the pellet. The cathode layer formed on the outer peripheral surface of the pellet formed by sintering tantalum or niobium oxide is to make the surface of the positive tantalum pellet negative, and the manganese dioxide ($MnO_2$) cathode layer having a cathode may be formed by impregnating the tantalum pellet, which is formed with a dielectric oxide coating layer as an insulating layer, in a nitrate-manganese solution to apply the nitrate-manganese solution on the outer peripheral surface of the tantalum pellet and sintering the tantalum pellet.

Further, a cathode reinforcement layer may be further provided on the outside of the cathode layer by sequentially applying carbon and silver pastes, and the cathode reinforcement layer facilitates electrical connection for polarity transmission to the cathode terminal 140 in contact with the cathode layer by improving conductivity for polarity of the cathode layer.

Since it is determined that the cathode layer and the cathode reinforcement layer correspond to the prior art that can be sufficiently appreciated by those skilled in the art when manufacturing the capacitor element 110 employed in the present embodiment, reference numerals of the cathode layer and the cathode reinforcement layer are omitted in the drawings.

The molding portion 120 including the anode wire 111 coupled to be protruded to one side may be provided on the outside of the capacitor element 110. The molding portion 120 can prevent the capacitor element 110 from being exposed to the outside to protect the capacitor element 110 and the anode wire 111 from external environment and is mainly made of an epoxy molding material.

The anode terminal 130 and the cathode terminal 140 may be coupled to a lower portion of the molding portion 120 surrounding the capacitor element 110 to expose lower surfaces thereof. The anode terminal 130 and the cathode terminal 140 are individually connected to the outer peripheral surfaces of the anode wire 111 and the capacitor element 110 through lead frames to have positive and negative polarities, respectively.

Looking into this in more detail, an upper surface of the cathode terminal 140 may be closely coupled to a lower surface of the capacitor element 110. At this time, the cathode terminal 140 may be electrically connected to the capacitor element 110 through a conductive paste 145, and a silver (Ag) paste may be mainly used as the conductive paste 145. Further, the conductive paste 145 may be one of the viscous conductive pastes such as Au, Pd, Ag, Ni, and Cu pastes in addition to the silver (Ag) paste and applied on a portion of the lower surface of the capacitor element 110 or the upper surface of the cathode terminal 140 to have sufficient hardness and bonding strength through processes such as drying, curing, and sintering.

Here, the conductive paste 145 may be cured at a temperature of 150° C. to 170° C.

The cathode terminal 140 may have an extending portion 141 to the inside of the capacitor element 110 to expand a bonding area of the capacitor element 110. The extending portion 141 plays the role of a lead frame for electrically connecting the cathode terminal 140 and the capacitor element 110, and a portion of a lower surface of the extending portion 141 may form a stepped portion 142 by etching or pressing for coupling and fixing of the molding portion 120. An epoxy molding material may be filled in the stepped portion 142 to fix the capacitor element 110 and the cathode terminal 140 when forming the molding portion 120 surrounding the outer peripheral surface of the capacitor element 110.

Further, the anode terminal 130 may be provided on one side of the cathode terminal 140 to expose a lower surface thereof to the outside. The anode terminal 130 is electrically connected to the one end portion of the anode wire 111 inserted in the one side surface of the capacitor element 110. A bending portion 131 formed by bending one side of the anode terminal 130 may be electrically connected to the anode wire 111.

The bending portion 131 may be integrally formed by bending the one side of the anode terminal 130 and bent at a bending angle θ of less than 90° based on a bending point of the anode terminal 130, that is, to form an acute angle with an upper surface of the anode terminal 130. At this time, a wire bonding portion 132 may be further formed in an upper end portion of the bending portion 131 to be bonded to the anode wire 111.

The wire bonding portion 132 may be bent from the upper end portion of the bending portion 131 to form an obtuse angle with the bending portion 131, and a concave groove portion 132a may be formed in a center portion of the wire bonding portion 132. The outer peripheral surface of the anode wire 111 may be in contact with the groove portion 132a of the wire bonding portion 132 to couple the wire bonding portion 132 and the anode wire 111 by electrical welding, particularly by laser welding, thereby electrically connecting the anode wire 111 to the anode terminal 130 through the bending portion 131.

Specifically describing the coupling structure of the anode terminal 130 and the anode wire 111 and the shape of the bending portion 131 as a coupling medium of the anode terminal 130 and the anode wire 111, the bending portion 131 may be formed by bending an outer area of the one side of the anode terminal 130 and electrically connect the anode terminal 130 and the anode wire 111 to function as an anode lead frame.

The bending portion 131 may be formed by bending the one side of the anode terminal 130. The bending portion 131 may be bent so that the upper end portion thereof is positioned inside the molding portion 120, that is, inside a free end portion of the anode wire 111. Accordingly, the bending portion 131 may be bent to have a slope on the anode terminal 130, and it is preferred that the bending angle of the bending portion 131 is 70° to 89.5° based on the upper surface of the anode terminal 130.

The bending angle θ of the bending portion 131 may be determined by the insertion position of the anode wire 111 inserted in the one side of the capacitor element 110 and the bonding position of the capacitor element 110. More specifically, referring to the following Table 1, when the bending angle θ of the bending portion 131 is 70° to 89.5° and the insertion position of the anode wire 111 is eccentric, there is no appearance defect of the capacitor 100. When the bending angle of the bending portion 131 is 80° to 89.5° and the insertion position of the anode wire 111 is in the center, there is no appearance defect of the capacitor 100. Here, the appearance defect of the capacitor 100 means that the position of the capacitor element 110 is excessively moved and thus the capacitor element 110 is exposed to the outside of the molding portion 120 or there is a contact failure between the end portion of the anode wire 111 and the upper end portion of the bending portion 131.

TABLE 1

| Bending angle | Element moving distance [mm] | | Appearance defect determination | |
|---|---|---|---|---|
| | eccentric | center | eccentric | center |
| 10 | 0.394 | 0.591 | X | X |
| 20 | 0.376 | 0.564 | X | X |
| 30 | 0.346 | 0.520 | X | X |
| 40 | 0.306 | 0.460 | X | X |
| 50 | 0.257 | 0.386 | X | X |
| 60 | 0.200 | 0.300 | X | X |
| 70 | 0.137 | 0.205 | ○ | X |
| 80 | 0.069 | 0.104 | ○ | ○ |
| 89.5 | 0.000 | 0.000 | ○ | ○ |
| 100 | −0.069 | −0.104 | X | X |

Figure 3A:
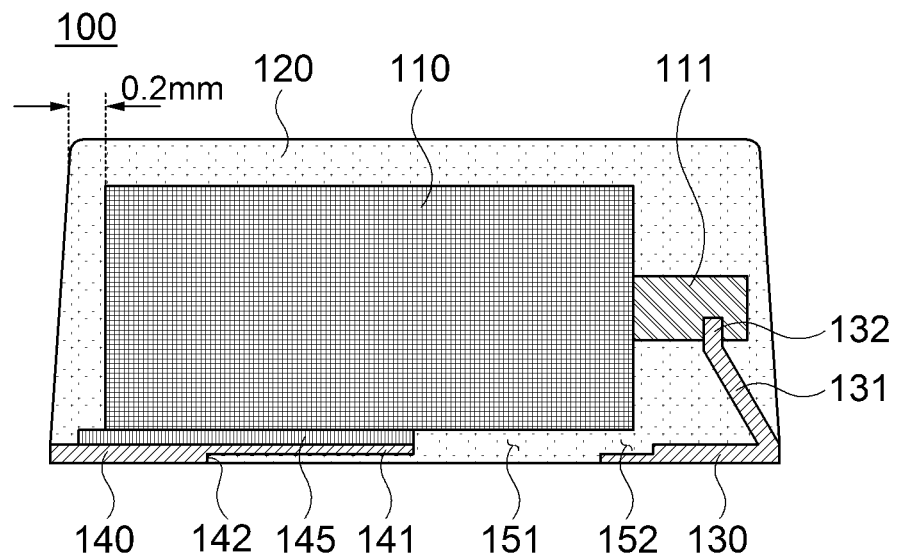
FIG. 3 is a comparative cross-sectional view according to a defect of the solid electrolytic capacitor in accordance with the present embodiment.

That is, referring to FIG. 3 with reference to the above Table 1, in order to prevent the appearance defect for securing the reliability of the capacitor 100, it is preferred that the molding portion 120 surrounding the outside of the capacitor element 110 has a thickness of about 0.2 mm from the other end portion of the capacitor element 110 as in FIG. 3a.

In other words, in order to maximize the capacity of the capacitor element 110 mounted on the upper surfaces of the anode terminal 130 and the cathode terminal 140 within a limited standard of the capacitor 100, the bending portion 131 bent from the anode terminal 130 is bent to the inside of the anode wire 111 and the length of the capacitor element 110 extends to the upper surface side of the anode terminal 130.

At this time, since the length of the capacitor element 110 should be limited to prevent the appearance defect due to the protrusion of the end portion of the anode wire 111 coupled to the capacitor element 110 to the outside of the molding portion 120, the bending portion 131 should be bent to the inside of the molding portion 120 at a predetermined angle and the angle θ of the bending portion 131 of the anode terminal 130 should be adjusted to be bonded to the anode wire 111 coupled to the capacitor element 110 after determining the bonding position of the capacitor element 110, which has a capacity maximized according to the standards of the capacitor 100, on the cathode terminal 140.

In this case, in the process of determining the position of the capacitor element 110 on the cathode terminal 140, the bonding position of the capacitor element 110 may be determined according to the bending angle θ of the bending portion 131 or the bonding position of the capacitor element 110.

Figure 3B:
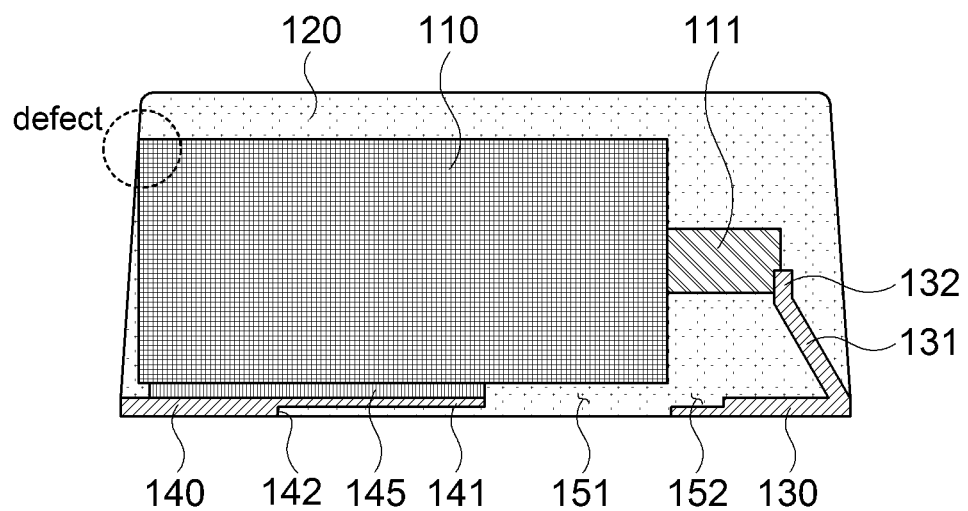
Figure 3C:
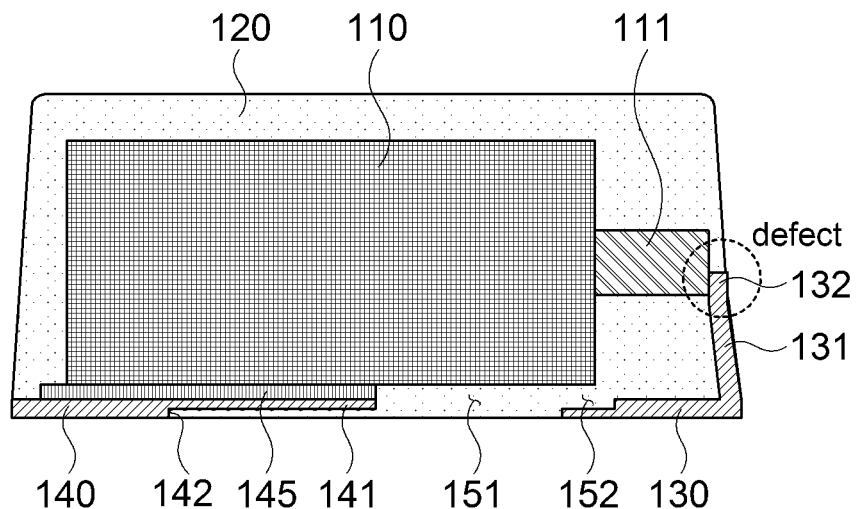

At this time, as shown in FIGS. 3b and 3c referring to the movement of the capacitor element 110 according to the bending angle of Table 1, when the bending angle θ of the bending portion 131 bonded to the anode wire 111 of the capacitor element 110 is out of the above-described range of 70° to 89.5°, the bonding position of the capacitor element 110 is moved by greater than 0.2 mm and thus the appearance defect that the capacitor element 110 is exposed to the outside of the molding portion 120 may occur. When the capacitor element 110 is moved to the inside of the molding portion 120 by 0.2 mm as in FIG. 3a to prevent the occurrence of the appearance defect, the angle of the bending portion 131 becomes more than a right angle and thus the contact failure between the anode wire 111 and the bending portion 131 may occur or the end portion of the bending portion 131 may be exposed to the outside of the molding portion 120 to cause the appearance defect.

And when the bending angle θ of the bending portion 131 is less than 70° and the anode wire 111 inserted in the capacitor element 110 is eccentric, bonding may be possible, but since the bending portion 131 may be excessively bent to the capacitor element 110 side, the capacitor element 110 and the end portion of the bending portion 131 may be in contact with each other to cause a short.

Therefore, in the capacitor 100 of the present embodiment, even when the insertion position of the anode wire 111 inserted in the capacitor element 110 is in the center or eccentric, it is preferred that the bending angle θ of the bending portion 131 based on the upper surface of the anode terminal 130 is 70° to 89.5° within a range that there is no appearance defect that the capacitor element 110 is exposed to the outside of the molding portion 120. At this time, the most appropriate bending angle θ for preventing the appearance defect and the bonding defect of the anode wire 111 and the anode terminal 130 without the movement of the bonding position of the capacitor element 110 may be 89.5°.

Meanwhile, a molding injection space 151 may be formed between the anode terminal 130 and the cathode terminal 140 and on the stepped portion 142 formed in the cathode terminal 140. The molding injection space extends to the upper surface of the anode terminal 130 to include a separation space 152 between the lower surface of the capacitor element 110 and the upper surface of the anode terminal 130. The molding injection space 151 may be integrally formed with the molding portion 120 by injecting a molding material surrounding the outside of the capacitor element 110 into the separation space, and the contact between the capacitor element 110 having a negative polarity and the anode terminal 130 may be prevented by the molding material injected into the separation space to prevent a short.

Like this, since the short between the capacitor element 110 and the anode terminal 130 and between the cathode terminal 140 and the anode terminal 130 can be prevented by the molding injection space 151 and the separation space 152 and the volume efficiency can be expanded by increasing the length of the capacitor element 110 to the upper surface side of the anode terminal 130, it is possible to apply the capacitor element 110 with the improved capacitance by about 20% or more compared to a typical solid electrolytic capacitor.

And, in the present embodiment, it is possible to improve ESR by 2% or more compared to the typical solid electrolytic capacitor by increasing the contact area between the cathode terminal 140 and the capacitor element 110 by the extending portion 141 on the one side of the cathode terminal 140.

A production method of the solid electrolytic capacitor of the present embodiment configured as above will be described with reference to FIGS. 4 to 10 shown below.

Figure 4:
Figure 5:
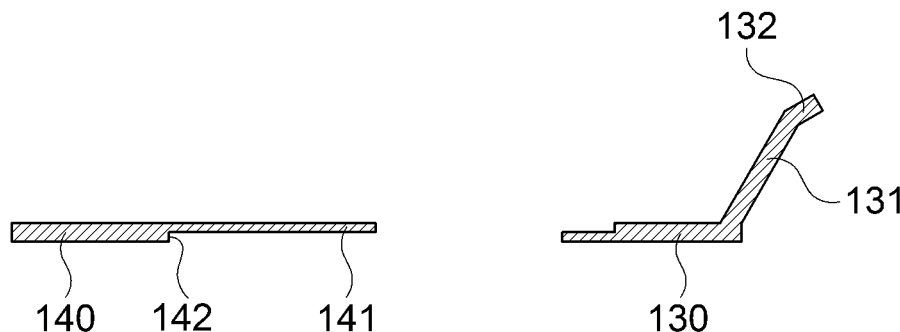
Figure 6:
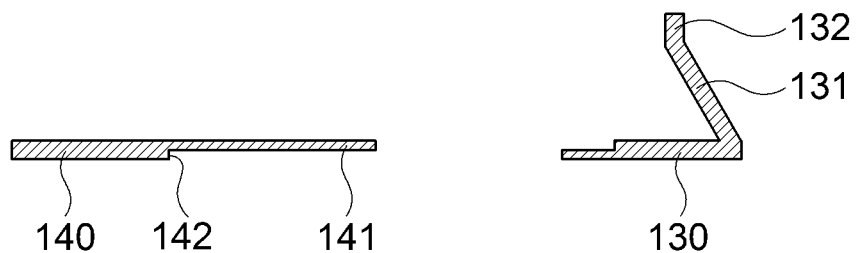
Figure 7:
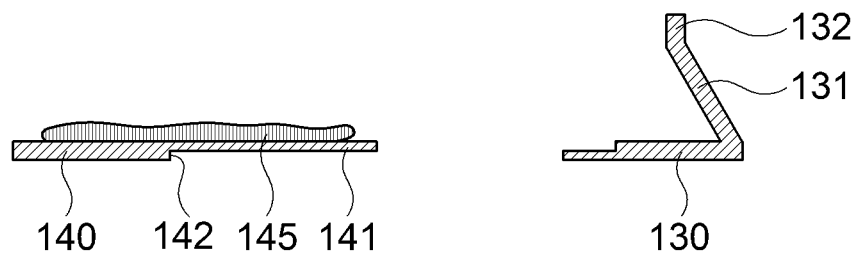
Figure 8:
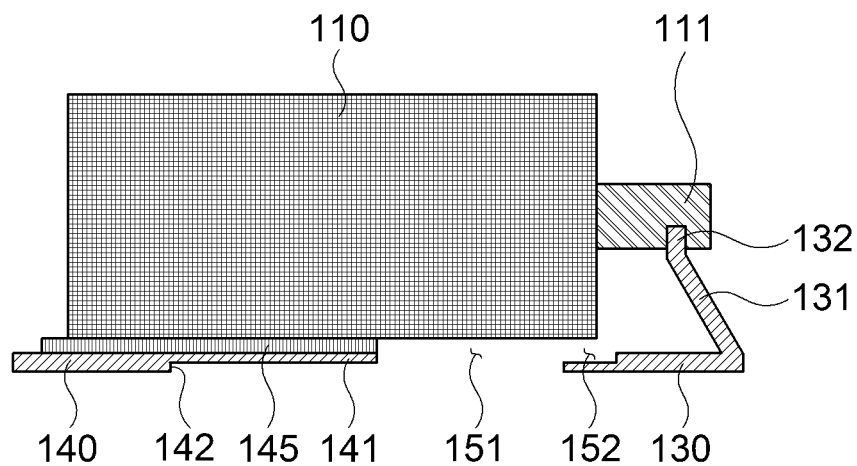
Figure 9:
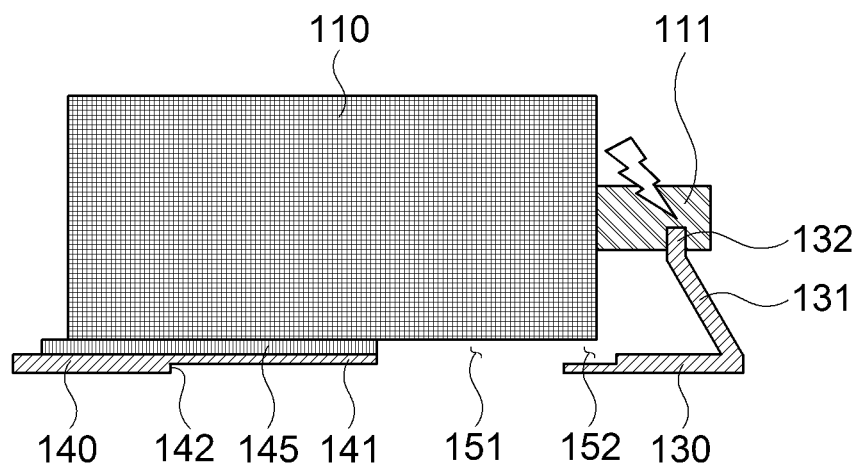
Figure 10:
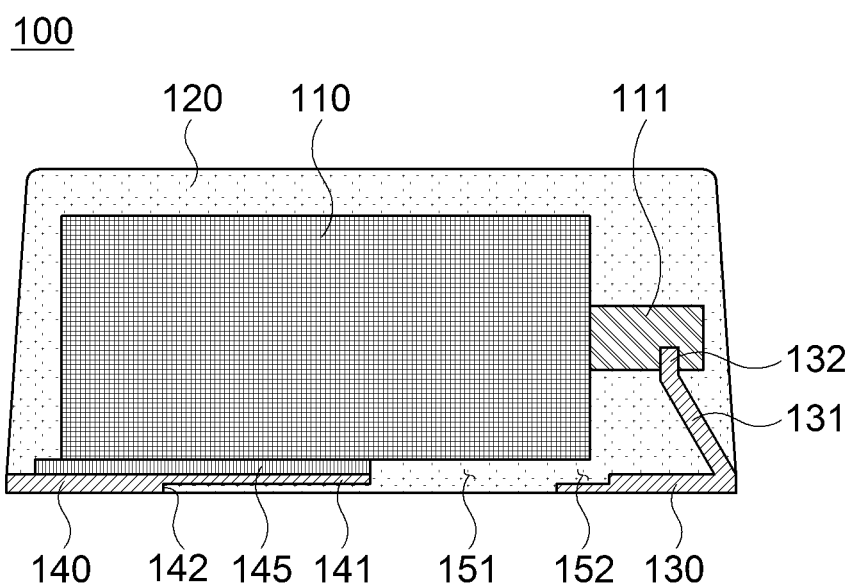

FIGS. 4 to 10 are production process diagrams of an embodiment of the solid electrolytic capacitor in accordance with the present invention, wherein FIG. 4 is a cross-sectional view of the step of preparing an anode terminal and a cathode terminal, FIGS. 5 and 6 are cross-sectional views of the step of forming a bending portion of the anode terminal, FIG. 7 is a cross-sectional view of the step of applying a conductive paste on the cathode terminal, FIGS. 8 and 9 are cross-sectional views of the step of mounting a capacitor element on the anode terminal and the cathode terminal, and FIG. 10 is a cross-sectional view of the step of forming a molding portion on the capacitor element.

As shown, in the production method of the solid electrolytic capacitor of the present embodiment, first, the cathode terminal 140 and the anode terminal 130 may be disposed on the same plane at predetermined intervals as in FIG. 4. At this time, the cathode terminal 140 may have an extending portion 141 extending to the anode terminal 130 side, and a stepped portion 142 may be formed on a lower surface of the cathode terminal 140 including the extending portion 141. And the anode terminal 130 may be cut to an appropriate length by considering a portion bonded to an anode wire of the capacitor element. And it is preferred that the anode terminal 130 and the cathode terminal 140 are made of nickel/iron alloy materials. Further, the stepped portion 142 formed on the lower surface of the cathode terminal 140 may be formed by etching or pressing.

The anode terminal 130 and the cathode terminal 140 may be coupled and fixed on a carrier (not shown in the drawing) formed of an adhesive film or a release film, and the anode terminal 130 and the cathode terminal 140 may be processed in a state of being attached on the carrier.

Next, a bending portion 131 may be formed by bending a portion of the anode terminal 130 at a predetermined angle as shown in FIGS. 5 and 6. The bending portion 131 may be primarily bent to form an obtuse angle with an upper surface of the anode terminal 130 and then secondarily bent to form an acute angle with the upper surface of the anode terminal 130. At this time, during the secondary bending of the bending portion 131, a bending angle θ of the bending portion 131 may be in the range of 70° to 89.5° with respect of the upper surface of the anode terminal 130.

At this time, the bending angle θ of the bending portion 131 may be adjusted in the range of 70° to 89.5° according to the bonding position of the capacitor element 110 coupled on the cathode terminal 140 and the anode terminal 130.

Next, a conductive paste 145 may be applied on an upper surface of the cathode terminal 140. A silver (Ag) paste may be mainly used as the conductive paste 145, and one of the viscous conductive pastes such as Au, Pd, Ag, Ni, and Cu pastes in addition to the silver paste may be used.

A predetermined amount of the conductive paste 145 may be applied on the upper surface of the cathode terminal 140 by a dotting method using a dispenser, and it is preferred that the amount of the conductive paste 145 is enough to be applied from the upper surface of the cathode terminal 140 to an upper surface of the extending portion 141.

After dotting the conductive paste 145 on the cathode terminal 140 as above, the capacitor element 110 having the anode wire 111 inserted in one side surface thereof may be mounted. At this time, a lower surface of the capacitor element 110 may be adhered closely to the cathode terminal 140 and the extending portion 131 extending to the inside of the cathode terminal 140 with a sufficient bonding area, and the capacitor element 110 may be mounted to have a separation space 152 with the anode terminal 130 by the thickness of the conductive paste 145 applied on the cathode terminal 140.

When mounting the capacitor element 110, the capacitor element 110 may be mounted on the cathode terminal 140 by applying a predetermined pressure and pressed so that the conductive paste 145 dotted on the cathode terminal 140 has a thickness of 10 μm to 70 μm.

In this case, the capacitor element 110 may be fixed on the cathode terminal 140 by the pressing of the capacitor element 110, but the bonding position of the capacitor element 110 may be adjusted in a state in which the conductive paste 145 is semi-cured by bonding the capacitor element 110 while applying predetermined heat to the lower surface of the cathode terminal 140. After that, when the bonding position of the capacitor element 110 is determined, the capacitor element 110 may be fixed by curing the conductive paste 145 at about 150 to 170° C. for about 40 to 60 minutes.

Next, when the bonding of the capacitor element 110 to the cathode terminal 140 is completed, the bending angle θ of the bending portion 131 may be adjusted so that the anode wire 111 protruded to one side of the capacitor element 110 and an upper end portion of the bending portion 131 integrally formed with the anode terminal 130 are bonded to each other. The bending angle θ of the bending portion 131 may be adjusted in the range of 70° to 89.5°, and preferably, the bending portion 131 may be bent at an angle of 89.5°. At this time, when the bending angle θ of the bending portion 131 is 89.5°, bonding may be possible without deviation of the bonding position of the capacitor element 110 as in the above Table 1, but the bonding position of the capacitor element 110 and the bending angle of the bending portion 131 may be determined within a size error range of the capacitor element 110.

Further, a wire bonding portion 132 may be further formed in an upper portion of the bending portion 131 to form an obtuse angle with the bending portion 131. It is preferred that a curved groove portion 132a may be provided in a center portion of the wire bonding portion 132 to closely couple a lower surface of the anode wire 111 to the groove portion 132a.

When the capacitor element 110 is fixed on the cathode terminal 140 and the anode wire 111 is bonded on the bending portion 131 of the anode terminal 130, the end portion of the anode wire 111 and the upper portion of the bending portion 131 may be fixed by electrical welding. At this time, laser welding may be mainly used as the electrical welding.

Next, when the anode wire 111 and the capacitor element 110 are fixed to the anode terminal 130 and the cathode terminal 140, respectively, the molding portion 120 may be formed on an outer peripheral surface of the capacitor element 110 using an EMC molding material. At this time, it is preferred that the molding material is filled in a molding injection space 151 and the separation space 152 under the capacitor element 110 to form the molding portion 120 by encapsulating the entire portion except the lower surfaces of the anode terminal 130 and the cathode terminal 140. At this time, the thickness of the molding portion 120 surrounding the other side surface of the capacitor element 110 may be about 2 mm when the bending angle of the bending portion 131 is 89.5° which is the most desirable bending angle, and the bonding position of the capacitor element 110 may be moved within a range in which the capacitor element 110 is not exposed to the outside of the molding portion 120 according to the adjustment of the angle of the bending portion 131.

And when forming the molding portion 120, the curing condition of the molding portion 120 may be different according to the EMC material and the shape but may be cured at a temperature of about 160 to 170° C. for 40 to 60 minutes.

After that, a carrier attached to the lower surfaces of the anode terminal 130 and the cathode terminal 140 may be removed after forming the molding portion 120. And after performing a deflash process of removing a flash on an outer surface of the molding portion 120, a capacity display marking portion may be further formed on the outer surface of the molding portion 120 by laser processing. And an aging process may be selectively performed to reduce the variation in electrical characteristics occurred in a capacitor assembly process.

Meanwhile, in the step of bonding the capacitor element, the capacitor element 110 may be mounted on the cathode terminal 140 after primarily bending the bending portion 131 of the anode terminal 130. For this, the step of applying the conductive paste 145 on the upper surface of the cathode terminal 140 may be performed first after the step of primarily bending the anode terminal 130. The capacitor element 110 may be closely coupled after applying the conductive paste 145 and the bending portion 132 may be secondarily bent to bond the upper end portion thereof to the anode wire 111. In the above processes, since it is determined that the specific process conditions of each process are fully described in the process conditions of the above-described embodiment, repeated descriptions will be omitted.

As described above, the solid electrolytic capacitor according to the present invention can maximize the overall size of the capacitor by exposing only the lower surfaces of the anode terminal and the cathode terminal to the outside and maximize the capacity of the capacitor element within a limited size of the capacitor by bending the bending portion, which is integrated with the anode terminal, to the capacitor element side at an acute angle to maximize the size of the capacitor element while preventing the appearance defect.

The above-described preferred embodiments of the present invention are disclosed for the purpose of exemplification and it will be appreciated by those skilled in the art that various substitutions, modifications and variations may be made in these embodiments without departing from the technical spirit of the present invention. Such substitutions and modifications are intended to be included in the appended claims.

What is claimed is:

1. A solid electrolytic capacitor comprising:
   a capacitor element having an anode wire inserted in one side surface thereof;
   a cathode terminal disposed on one side under the capacitor element to be electrically connected to the capacitor element;
   an anode terminal disposed on the other side under the capacitor element, and having a bending portion integrally formed to be inclined to the capacitor element for electrical connection with the anode wire and a wire bonding portion formed in an upper end portion of the bending portion to be bonded to the anode wire; and
   a molding portion surrounding the outside of the capacitor element and formed to expose lower surfaces of the cathode terminal and the anode terminal;
   wherein the wire bonding portion forms an obtuse angle with respect to the bending portion.

2. The solid electrolytic capacitor according to claim 1, wherein the cathode terminal is electrically connected to the capacitor element through a conductive paste, wherein the conductive paste is one selected from Ag, Au, Pd, Ni, and Cu pastes having viscosity.

3. The solid electrolytic capacitor according to claim 1, wherein the cathode terminal has an extending portion to the inside of the capacitor element, wherein a portion of a lower surface of the extending portion is a stepped portion.

4. The solid electrolytic capacitor according to claim 3, wherein the conductive paste applied on an upper surface of the cathode terminal is applied to an upper surface of the extending portion.

5. The solid electrolytic capacitor according to claim 1, wherein the bending portion is bent from one side of the anode terminal to have an acute bending angle with respect to an upper surface of the anode terminal.

6. The solid electrolytic capacitor according to claim 1, wherein the wire bonding portion has a groove portion in a center portion thereof.

7. The solid electrolytic capacitor according to claim 1, wherein the bending portion functions as an anode lead frame for electrically connecting the anode terminal and the anode wire.

8. The solid electrolytic capacitor according to claim 5, wherein the bending angle of the bending portion is 70° to 89.5° based on the upper surface of the anode terminal.

9. The solid electrolytic capacitor according to claim 1, wherein the thickness of the molding portion surrounding the outside of the capacitor element is 0.2 mm from the outside of the other end portion of the capacitor element.

10. The solid electrolytic capacitor according to claim 1, wherein the molding portion is integrally formed with a molding injection space between the cathode terminal and the anode terminal and a separation space between the capacitor element and the anode terminal.

\* \* \* \* \*